United States Patent [19]

Devine

[11] Patent Number: 5,291,921
[45] Date of Patent: Mar. 8, 1994

[54] DRAINAGE PLATFORM FOR THE DRAINING OF RESIDUAL CONTENTS OF A CONTAINER FOR COLLECTION AND SUBSEQUENT DISPOSAL

[75] Inventor: Robert Devine, Bayshore, N.Y.

[73] Assignee: Chem-Tainer Industries, Inc., North Babylon, N.Y.

[21] Appl. No.: 55,716

[22] Filed: Apr. 28, 1993

[51] Int. Cl.⁵ .................... B65B 1/04; B65B 3/04
[52] U.S. Cl. ........................... 141/86; 141/106; 141/332; 141/340; 220/571; 248/94
[58] Field of Search ............. 141/331–345, 141/86, 106, 364, 375; 248/94, 311.3, 312, 312.1; 220/571

[56] References Cited

U.S. PATENT DOCUMENTS

| | | | |
|---|---|---|---|
| D. 20,922 | 7/1891 | Coben . | |
| 162,998 | 5/1875 | Collison | 141/332 |
| D. 230,629 | 3/1974 | Camp et al. . | |
| 418,738 | 1/1890 | Mowll | 141/332 |
| 478,303 | 7/1892 | Allgood | 141/106 |
| 483,664 | 10/1892 | Aborn | 141/106 |
| 1,733,261 | 10/1929 | Higby et al. | 141/106 |
| 2,086,939 | 7/1937 | Elsy et al. | 221/69 |
| 3,124,251 | 3/1964 | Guth | 211/74 |
| 4,022,257 | 5/1977 | O'Connell | 141/98 |
| 4,054,184 | 10/1977 | Marcinko | 141/313 |
| 4,099,598 | 7/1978 | Clinard | 141/313 |
| 4,334,557 | 6/1982 | Yasenka | 141/98 |
| 4,698,861 | 10/1987 | Bogusz | 141/333 |
| 4,802,599 | 2/1989 | Hill | 141/86 |
| 4,832,095 | 5/1989 | Bonnell | 141/106 |
| 4,974,647 | 12/1990 | Eastom | 141/98 |
| 5,018,559 | 5/1991 | Branan | 141/339 |
| 5,143,178 | 9/1992 | Latham, Jr. | 141/340 |

Primary Examiner—Ernest G. Cusick
Assistant Examiner—Steven O. Douglas
Attorney, Agent, or Firm—Samuelson & Jacob

[57] ABSTRACT

A drainage platform supports an expendable container on a receptacle in a stable and appropriate orientation to assist in draining residual contents from the mouth of the container into the receptacle for the separate disposal of the container and the residual contents, the drainage platform including a pan with a downwardly sloping bottom and a sump with a drain, the sump being offset from the center of the drainage platform to register the drain with a corresponding offset opening in the receptacle, and a plurality of ribs establishing an essentially horizontal support for the container above the downwardly sloping bottom such that the residual contents are drained into the sump and then through the drain into the receptacle for collection and disposal of the residual contents separate from the disposal of the expendable container. A supplemental wire rack includes a base frame for resting on the horizontal support, and upwardly projecting posts for entering the mouth of the container to enhance the stability of the container placed on the horizontal support.

15 Claims, 4 Drawing Sheets

DRAINAGE PLATFORM FOR THE DRAINING OF RESIDUAL CONTENTS OF A CONTAINER FOR COLLECTION AND SUBSEQUENT DISPOSAL

The present invention relates generally to the handling and disposal of waste materials and pertains, more specifically, to a drainage platform for facilitating the draining and collection of residual contents from containers for appropriate environmentally safe disposal of expendable containers and the drained residual contents.

An increasing emphasis on environmental protection, as well as on safety in the workplace, has led to the requirement for improvements in the manner in which waste materials are handled for disposal. In particular, appropriate separate disposal of expended containers, such as oil cans, oil filters, paint cans and the like, requires that residual contents be drained from such a container prior to appropriate disposal of the container, and that the residual contents be collected for subsequent proper disposal of the collected contents.

It has been suggested that the residual contents of expended containers can be gathered in the workplace by draining the containers into a relatively larger receptacle, such as a common fifty-five gallon industrial drum Funnel-like devices have ben proposed which are placed upon an industrial drum and include a pan with a bottom sloped toward a drain placed over the bung opening of the drum. Expended containers are placed directly on the sloped bottom, in an inverted orientation, so as to enable the containers to drain, unattended, over the time necessary to empty the containers. While such devices are helpful, in that a container may be left to drain, unattended, while a worker performs other tasks, it has been found that a container placed directly on the sloped bottom of the device tends to be unstable and readily can be knocked over, or otherwise toppled, leading to ineffective draining or, even worse, hazardous spills.

The present invention provides a drainage platform which facilitates the draining and collection of residual contents from containers for appropriate disposal of both the expended container and the drained contents and, as such, attains several objects and advantages, some of which are summarized as follows: Enables ease and effectiveness in the draining and collection of residual contents from expended containers for safe and efficient disposal of the containers and the drained residual contents; provides a simple and relatively inexpensive device which is adapted readily to the draining of a wide variety of containers for appropriate disposal; facilitates the use of a standard drum, such as the ubiquitous fifty-five gallon drum, for environmentally safe and effective collection and disposal of residual contents drained from expendable containers; promotes safety in the workplace, as well as environmental protection, through simplifying and facilitating handling and appropriate disposal of expendable articles and waste materials; reduces the cost of complying with appropriate disposal procedures and regulations; increases the awareness of the necessity for compliance with appropriate disposal procedures while facilitating such procedures; provides and economical device which encourages widespread use for increased safety and environmental protection.

The above objects and advantages, as well as further objects and advantages, are attained by the present invention which may be described briefly as a drainage platform for supporting a container on a receptacle in a stable and appropriate orientation to assist in draining contents from the container into the receptacle, the container having a mouth through which the contents drain, the drainage platform comprising: a pan having an outer peripheral rim and an inner sump, the pan including a bottom sloping downwardly between the rim and the sump, and a drain in the sump; and a plurality of ribs having basal portions extending along the downwardly sloping bottom of the pan, and support portions extending essentially horizontally above the downwardly sloping bottom such that upon juxtaposition of the draining platform with the receptacle, the container is received in stable placement on the essentially horizontal support portions of the ribs, with the mouth of the container confronting the downwardly sloping bottom of the pan, to drain the contents from the container to the pan and conduct the drained contents to the sump and through the drain to the receptacle.

The invention will be understood more fully, while still further objects and advantages will become apparent, in the following detailed description of a preferred embodiment of the invention illustrated in the accompanying drawing, in which.

Figure 1:
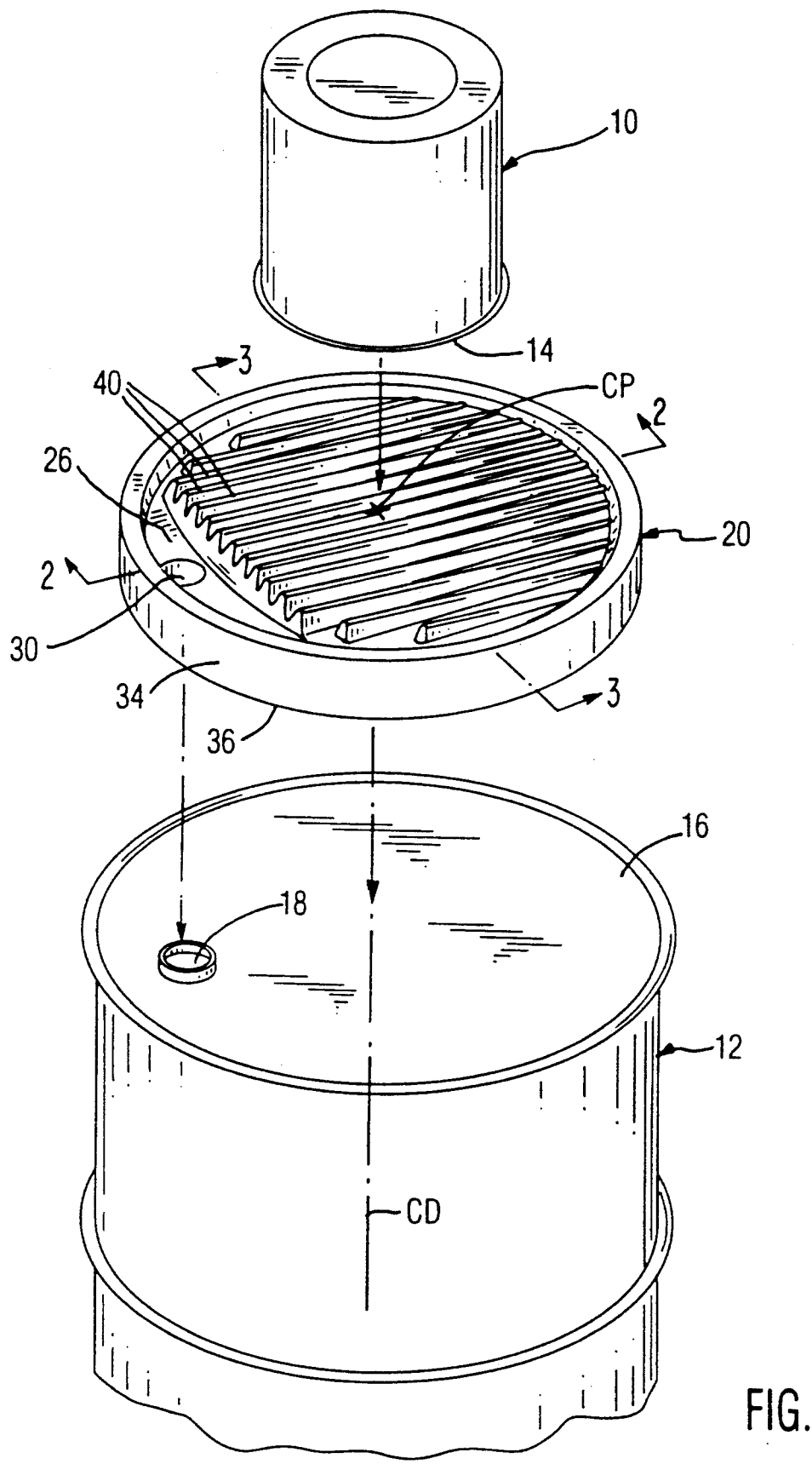
FIG. 1 is an exploded pictorial view of a drainage platform constructed in accordance with the present invention and being juxtaposed with a fifty-five gallon drum for use in draining the residual contents of a container and collecting the drained contents in the drum.

Referring now to the drawing, and especially to FIG. thereof, an expended container 10, such as an oil filter, an oil can, a paint can or the like, is being readied for disposal by draining residual contents, such as oil, paint or the like, respectively, from the container 10. The residual contents are to be collected in a suitable receptacle, here shown in the form of a fifty-five gallon industrial drum 12, for suitable disposal of the collected contents. The container 10 has an open mouth 14 at one end of the container 10 and the container 10 is oriented with the mouth 14 facing downwardly, confronting the drum 12. The drum 12 has an uppermost head 16 which includes a standard bung opening 18 offset from the center of the head 16, which center coincides with the central axis CD of the drum 12, as is conventional in the construction of industrial drums.

Figure 2:
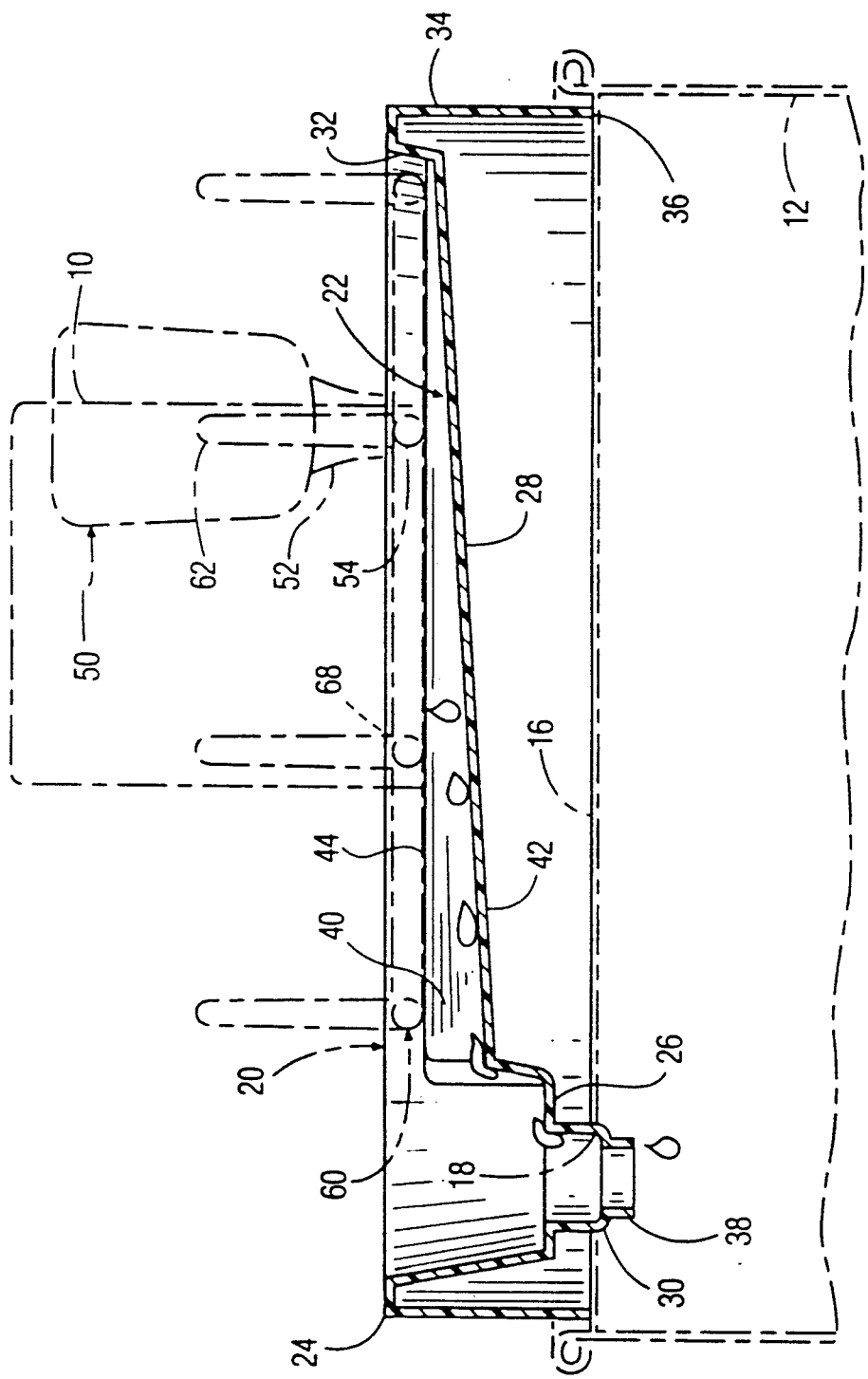
FIG. 2 is a enlarged cross-sectional view of the drainage platform, taken along line 2—2 of FIG. 1, and showing the drainage platform in use.
Figure 3:
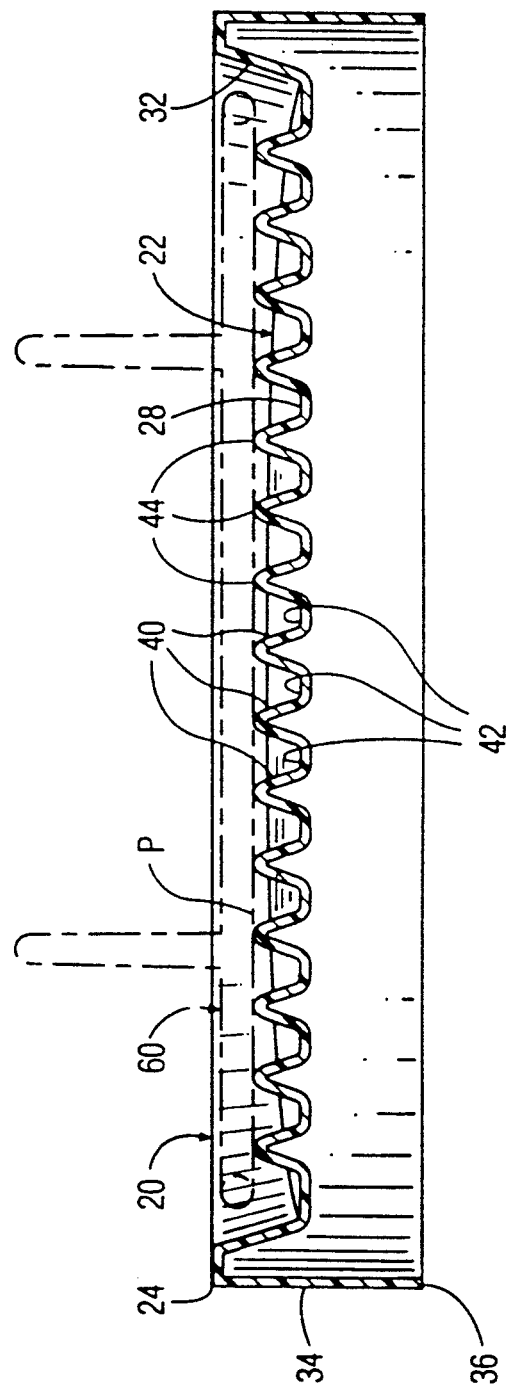
FIG. 3 is an enlarged cross-sectional view of the drainage platform, taken along line 3—3 of FIG. 1.

In order to facilitate the draining of the residual contents from the container 10 and collection of the drained contents into the drum 12, a drainage platform 20, constructed in accordance with the present invention, is interposed between the container 10 and the drum 12. As best seen in FIGS. 2 and 3, as well as in FIG. 1, drainage platform 20 includes a pan 22 having an outer peripheral rim 24 and an inner sump 26. The pan 22 has a bottom 28 which slopes downwardly between the rim 24 and the sump 26, and a drain is provided in the sump 26 in the form of a drain pipe 30 projecting downwardly from the sump 26. The outer peripheral rim 24 includes an uppermost peripheral lip 32 which surrounds the bottom 28 of the pan 22 and the sump 26, and a depending generally annular skirt 34 extending downwardly from the lip 32 to a basal support 36. The relative diameters of the head 16 of the drum 12 and of the skirt 34 of the drainage platform 20 are such that the drainage platform 20 is received on the head 16 of the drum 12 with the basal support 36 resting against the head 16, as illustrated in phantom in FIG. 2. The sump 26 preferably is offset from the center CP of the drainage platform 20 so as to lie over the bung opening 18. The location and length of drain pipe 30 are such that the drain pipe 30 is registered with the bung opening 18 and enters the bung opening 18, as illustrated. A necked-down portion 38 of the drain pipe 30 facilitates location and insertion of the drain pipe 30 into the bung opening 18.

Once the drainage platform 20 is seated upon the drum 12, as shown in FIG. 2, the container 10 is placed on the drainage platform 20, with the open mouth 14 of the container 10 confronting the head 16 of the drum 12. A plurality of ribs 40 have basal portions 42 extending along the bottom 28 of pan 22 and support portions 44 extending essentially horizontally above the downwardly sloping bottom 28 of the pan 22. Thus, upon juxtaposition of the drainage platform 20 with the drum 12, the container 10 is received on the support portions 44 of the ribs 40 with the open mouth 14 of the container 10 oriented essentially horizontally and confronting the downwardly sloping bottom 28 of the pan 22. In this manner, the container 10 is provided with a stable resting position which militates against tipping so as to assure complete drainage and preclude spillage during the time it takes to accomplish essentially complete draining of the residual contents from the container 10. In addition, the peripheral lip 32, which extends upwardly above the support portions 44 of the ribs 40, serves as an added safety measure in containing any spills which may occur upon orientation and placement of containers 10 on the drainage platform 20. In effect, the drainage platform 20 serves as a funnel, while the ribs 40 provide a generally horizontal platform for the stable support of a container 10 during the time necessary for the accomplishment of the complete draining of residual material from the container 10. Since these residual materials very often have a viscosity which requires considerable time for such drainage, the drainage platform 20 provides a convenient and easy-to-use device for the ready placement of containers in a draining orientation appropriately juxtaposed with a collection receptacle, such as drum 12, for thorough draining of the residual contents. Thus, drainage platform 20 assists in accomplishing the complete separation of the residual contents from an expended container and enables the separate disposal of expended containers and residual content with increased safety in the workplace and in compliance with environmental protection procedures.

In the preferred construction, ribs 40 extend longitudinally across the drainage platform 20 and are generally parallel to one another. The support portions 44 preferably are located in a common essentially horizontal plane P, as seen in FIG. 3, for providing the desired stability in the supported containers 10, and the ribs 40 are spaced apart laterally to enable the residual contents to drain downwardly between the ribs 40 to the sloping bottom 28 of the pan 22, while maintaining that stability. The drainage platform 20 preferably is constructed in a one-piece, unitary member molded of a synthetic polymeric material, such as polyethylene. Such a simple and relatively low cost molded construction enables the drainage platform 20 to be made available for widespread use in the handling of expendable containers and residual contents for appropriate disposal with increased ease and economy.

Figure 4:
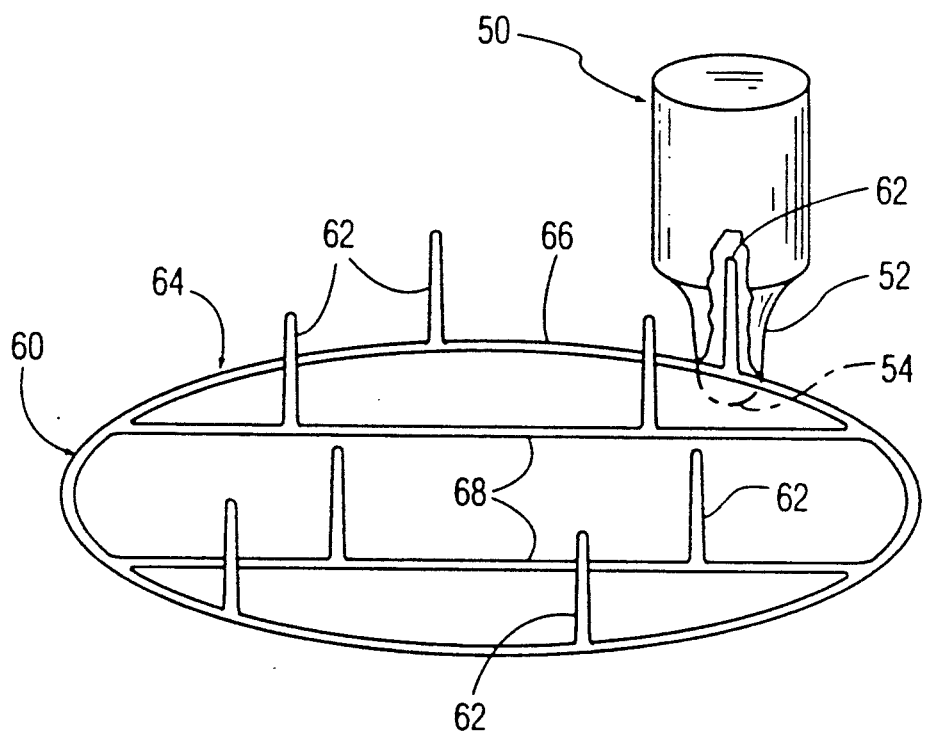
FIG. 4 is a perspective view of a supplemental rack of the drainage platform, with an alternate container thereon.

Referring now to FIG. 4, as well as to FIGS. 2 and 3, where the container to be drained is of the type having a relatively narrow mouth, such as a bottle 50 having a neck 52 leading to a relatively narrow mouth 54, a supplemental rack 60 is provided for enhancing the stability of the container when the container is placed upon the drainage platform 20. Rack 60 includes a plurality of posts 62 projecting upwardly from a base frame 64 and spaced apart from one another along the base frame 64. In the preferred arrangement, rack 60 is a unitary construction of wire, with the posts 62 being integral with the base frame 64. Base frame 64 includes a perimeter frame member 66 and essentially horizontal stringers 68, and posts 62 project upwardly from the perimeter frame member 66 and the stringers 68. The rack 60 is placed on the ribs 40 so that the stringers 68 extend transverse to the ribs 40 and the base frame 64 is supported upon the support portions 44 of the ribs 40. A bottle 50 is placed on the drainage platform 20 with the mouth 54 of the bottle 50 confronting the bottom 28 of the pan 22 and a post 62 entering the mouth 54 of the bottle 50 to enhance the stability of the bottle 50 as the bottle 50 is drained. The open construction of the base frame 64 enables appropriate draining.

It will be seen that the drainage platform 20 accomplishes the several objects and advantages summarized above, namely: Enables ease and effectiveness in the draining and collection of residual contents from expended containers for safe and efficient disposal of the containers and the drained residual contents; provides a simple and relatively inexpensive device which is adapted readily to the draining of a wide variety of containers for appropriate disposal; facilitates the use of a standard drum, such as the ubiquitous fifty-five gallon drum, for environmentally safe and effective collection and disposal of residual contents drained from expendable containers; promotes safety in the workplace, as well as environmental protection, through simplifying and facilitating handling and appropriate disposal of expendable articles and waste materials; reduces the cost of complying with appropriate disposal procedures and regulations; increases the awareness of the necessity for compliance with appropriate disposal procedures while facilitating such procedures; provides and economical device which encourages widespread use for increased safety and environmental protection.

It is to be understood that the above detailed description of a preferred embodiment of the present invention is provided by way of example only. Various details of design and construction may be modified without departing from the true spirit and scope of the invention, as set forth in the appended claims.

The embodiments of the invention in which an exclusive property or privilege is claimed are defined as follows:

1. A drainage platform for supporting a container on a receptacle in a stable and appropriate orientation to assist in draining contents from the container downwardly in an essentially vertical direction into the receptacle, the container having a mouth through which the contents drain, the drainage platform comprising:

a pan having an outer peripheral rim and an inner sump, the pan including a bottom sloping downwardly between the rim and the sump, and a drain in the sump; and a plurality of ribs having basal portions extending along the downwardly sloping bottom of the pan, and support portions extending essentially horizontally above the downwardly sloping bottom such that upon juxtaposition of the draining platform with the receptacle, the container is received in stable placement on the essentially horizontal support portions of the ribs, such that the contents are drained in the vertical direction essentially normal to the support portions with the mouth of the container confronting the downwardly sloping bottom of the pan, to drain the contents from the container to the pan and conduct the drained contents to the sump and through the drain to the receptacle.

2. The invention of claim 1 wherein the ribs are generally parallel to one another, extend longitudinally along the pan, and are spaced apart laterally so as to enable the contents to drain downwardly from the container between the ribs to the downwardly sloping bottom.

3. The invention of claim 2 wherein the support portions of the ribs are located in an essentially horizontal common plane.

4. The invention of claim 1 wherein the pan and the ribs are in the form of a unitary, one-piece construction of molded synthetic polymeric material.

5. The invention of claim 4 wherein the ribs are generally parallel to one another, extend longitudinally along the pan, and are spaced apart laterally so as to enable the contents to drain downwardly from the container between the ribs to the downwardly sloping bottom, and the support portions of the ribs are located in an essentially horizontal common plane.

6. The invention of claim 1 wherein the receptacle is a drum having a head including a center and a bung opening in the head offset from the center, and the pan includes a center, and a basal support extends along the rim for supporting the pan on the head of the drum, the sump being offset from the center of the pan so as to register the drain with the bung opening when the drainage platform is placed on the head of the drum.

7. The invention of claim 6 wherein the ribs are generally parallel to one another, extend longitudinally along the pan, and are spaced apart laterally so as to enable the contents to drain downwardly from the container between the ribs to the downwardly sloping bottom.

8. The invention of claim 7 wherein the support portions of the ribs are located in an essentially horizontal common plane.

9. The invention of claim 6 wherein the pan and the ribs are in the form of a unitary, one-piece construction of molded synthetic polymeric material.

10. The invention of claim 9 wherein the ribs are generally parallel to one another, extend longitudinally along the pan, and are spaced apart laterally so as to enable the contents to drain downwardly from the container between the ribs to the downwardly sloping bottom, and the support portions of the ribs are located in an essentially horizontal common plane.

11. The invention of claim 10 wherein the drain includes a drain pipe projecting downwardly from the sump to extend into the bung opening when the basal support rests upon the head of the drum.

12. The invention of claim 10 wherein the rim includes an uppermost peripheral lip extending upwardly above the support portion of the ribs and a skirt extending downwardly between the lip and the basal support.

13. The invention of claim 1 including a plurality of posts projecting vertically upwardly above the support portions of the ribs for entering the mouth of the container to enhance the stability of the container placed on the support portions with the mouth of the container confronting the bottom of the pan.

14. The invention of claim 13 including a base frame for resting upon the support portions of the ribs, the posts being integral with the base frame at locations spaced apart along the base frame.

15. The invention of claim 14 wherein the base frame and the posts comprise a unitary rack constructed of wire.

* * * * *